United States Patent [19]

Tuttle

[11] Patent Number: 4,963,715
[45] Date of Patent: Oct. 16, 1990

[54] VARIABLE POLARITY POWER SUPPLY FOR WELDING

[75] Inventor: Wayne H. Tuttle, Torrance, Calif.

[73] Assignee: Venable Industries, Inc., Torrance, Calif.

[21] Appl. No.: 328,949

[22] Filed: Mar. 27, 1989

[51] Int. Cl.$^5$ .............................................. B23K 9/073
[52] U.S. Cl. .......................... 219/130.4; 219/130.31; 219/137 PS
[58] Field of Search ........... 219/130.4, 130.21, 130.31, 219/130.51, 137 PS

[56] References Cited

U.S. PATENT DOCUMENTS

| | | | |
|---|---|---|---|
| 2,867,730 | 1/1959 | Welch | 219/130.31 |
| 3,068,352 | 12/1962 | Correy . | |
| 3,300,683 | 1/1967 | Weishaar . | |
| 3,330,933 | 7/1967 | Maklary . | |
| 3,382,345 | 5/1968 | Normando . | |
| 3,598,954 | 8/1971 | Iceland et al. . | |
| 3,780,258 | 12/1973 | Iceland et al. | 219/130.51 |
| 3,781,508 | 12/1973 | Dauer et al. . | |
| 3,894,210 | 7/1975 | Smith et al. . | |
| 3,999,034 | 12/1976 | Barhorst . | |
| 4,092,517 | 5/1978 | Woodacre . | |
| 4,180,720 | 12/1979 | Barhorst . | |

*Primary Examiner*—Clifford C. Shaw
*Attorney, Agent, or Firm*—Knobbe, Martens, Olson & Bear

[57] ABSTRACT

Disclosed is a variable polarity power supply for arc welding that quickly switches between polarities in order to more easily re-establish the arc. The variable polarity power supply includes a current-limited boost circuit for providing increased open circuit voltage to re-establish the arc, while limiting the re-establishment current. The variable polarity power supply is particularly suitable for computer-controlled welding applications because it periodically restarts the arc in either direction without using high frequency radiation, and provides quick switching times along with a low reverse current to reduce the heat in the torch, thereby increasing the longevity of the torch.

27 Claims, 4 Drawing Sheets

VARIABLE POLARITY POWER SUPPLY FOR WELDING

BACKGROUND OF THE INVENTION

This invention relates to power supplies for variable polarity arc welding, and specifically to power supplies having a capability for reversing polarity at the output.

Arc welding is a well-known method of joining together pieces of metal, or of cutting through a piece of metal. Some metals weld autogenously whereas other metals may require the introduction of additional metal during the welding process. An arc welder accomplishes his goals by connecting one pole of a welding power supply to the workpiece, and the other pole to a torch, such as a non-consumable tungsten rod. In gas tungsten arc welding (GTAW), a gas such as helium is applied between the torch and the workpiece. After an arc is struck between the torch and the workpiece, electrons emitted from the negative pole and electrons released in collisions within the gas are drawn toward the more positive pole. These electrons develop a velocity that is transformed into heat when they strike the positive pole, and thus produce a large amount of heat in the area where the arc is incident.

In more practical terms, the welding process may be described from the position of the welder. First he must create an arc between the torch and the workpiece. Conventionally, this is accomplished by applying high frequency radiation to the area around the weld. This ionizes the shield gas in the areas between the poles and facilitates formation of the arc. When a welder is welding in what is termed a "forward direction", electrons are emitted in an arc that extends toward the workpiece. These electrons then bombard the workpiece, creating a high temperature in the workpiece and forming a "weldpool" of molten metal. When welding in the forward direction, the torch is the negative pole and the workpiece is the positive pole.

Thus, a welder can produce a high temperature in a relatively limited area. However, if he were to limit his welding only to the forward direction, a problem would arise that may severely affect the quality of the weld. This problem is the formation of oxides in and about the weldpool that results, at least in part from the high temperature of the metal in the immediate vicinity of the arc. The presence of oxides adversely affects the strength of the weld. Certain metals, such as aluminum, superalloys, manganese alloys and brass, are particularly prone to oxide formation during arc welding. Many of these metals are of great importance to industry. For example superalloys, which are alloys of titanium, are of great utility in aircraft engines. As another example, the aluminum alloy 2219 is of great interest to the space shuttle program, and welds of this material must meet exacting specifications which require that they be substantially free of flaws caused by oxide. Thus, the problem of oxide formation in welding is a problem that affects virtually all products that use these metals.

To substantially reduce oxide formation, it has been conventional to periodically reverse the direction of the current between the torch and the workpiece. In the reverse direction, the workpiece is the negative pole, and the torch is the positive pole. Application of current in the reverse direction has a "cleansing" effect that has been found to remove the oxide formed in the immediate vicinity of the weld. Specifically, the oxide is broken down during the time that reverse current is being applied. The amount of such cleansing depends upon the length and magnitude of the reverse current.

Thus, there is a need for a power supply that periodically changes current between forward and reverse. In the portion of the cycle during which a forward current is being applied, the workpiece which is the positive pole is being heated to form a weldpool of molten metal. Although heat is also generated in the torch, which is the negative pole during this cycle, a greater amount of heat is generated in the workpiece. In the portion of the cycle during which a reverse current is being applied, the workpiece is being "cleansed" of oxides. During this time, the flow of electrons is from the workpiece, which is the negative pole, to the torch, which is the positive pole, therefore generating greater heat in the torch.

To provide a periodically reversing current, it has been suggested to apply an alternating current, such as a sine wave to the workpiece and torch. Using this approach, it was found difficult to restart the current following the transition to current flow in the opposite direction. This is because the arc was extinguished during the transition through the zero point of the alternating current. However, if the current was reversed more quickly, with a periodic function similar to a square wave, it was found that it was much easier to restart the arc. Such a quick reversal uses the fact that the arc, which is in fact a plasma containing electrons and ions, dissipates over several milliseconds. If the current is reversed quickly enough, the plasma is still present in sufficient quantity to substantially aid in restarting the arc in the opposite direction.

Also, to restart the arc, even when using a square wave curve, it was found necessary to initially apply a much larger voltage than that normally appearing across the arc. For example, while welding with a normal current, an arc will typically have a voltage drop of 10 to 20 volts in argon gas and 15 to 35 in helium gas. However, the larger voltage that is necessary to restart the arc may require up to 190 volts. Thus, the arc itself has a negative resistance. Simply put, a negative resistance means that the gap between the torch and the workpiece has a resistance that decreases as current increases. For example, before an arc is established, the gap has a very large resistance that decreases substantially after the arc is established and current is flowing.

Thus, a need has arisen for a power supply capable of quickly reversing current direction, while also providing large voltages during the transition time when current is reversed. However, due to limitations of power supplies at the high levels of current necessary for effective welding, it is often difficult to design an economical power supply that can quickly change current direction in the environment of arc welding. Ideally, a current supply should supply a constant current, regardless of the load across it. In other words, this means that an ideal current source would have an infinite "open circuit voltage", which is the voltage that would appear across the current source with an open circuit as a load. Practically, a current supply has a finite open circuit voltage, which operates to limit the performance of power supplies used for arc welding. A typical high performance current source used in arc welding, such as the Pulsweld Model P200 available from Venable Industries, Inc., Torrance, Calif. which is capable of providing 200 amperes has an open circuit voltage of about 65 volts.

The open circuit voltage is an important measure of the performance of an arc welding power supply because, as mentioned above, the arc itself has a negative resistance, and if the system is going to properly restart the arc, the open circuit voltage must be sufficient to accomplish this. The open circuit voltage of the current source is an important measure of the ability of the power supply to bridge the gap, restart the arc and establish current flow. Thus, there is a need for a power supply that is economical, has a large open circuit voltage, and provides sufficient current for arc welding.

To overcome current source limitations in restarting the arc, such as the open circuit voltage limitation, it has been suggested to periodically apply a high frequency, such as r.f. (radio frequency) to the torch and workpiece. If this high frequency is applied coincidentally with the transitions through the zero point, the arc will restart much more easily following the transition because the high frequency radiation acts to break down the oxide layer. Thus, if a separate source of high frequency radiation is applied, the open circuit voltage of present power supplies will be adequate for the power supply.

A disadvantage of using high frequency radiation is that the high frequency radiation produced necessarily on each transition is a source of noise for electronic components and can detrimentally affect computer operation. Because of this disadvantage, it is undesirable to use such high frequency radiation in proximity to computer equipment without costly shielding of the computer or the weld site. This disadvantage is especially significant because computer-controlled welding is becoming widespread. Many manufacturing facilities have at least one computer-controlled operation. For example, welding in automated car assembly lines is computer-controlled.

The additional hardware necessary to produce high frequency is a further disadvantage. A power supply providing high frequency radiation may include additional hardware such as a high frequency generator, a control timer, and connections, all of which increase cost and complexity of the power supply.

As an alternative to high frequency radiation in the transitions, it has been suggested that two current sources be used in a single power supply. In this power supply with dual current sources, one of the current sources provides current in both directions, and the other current source provides additional current in the reverse direction. To switch between forward and reverse current, SCRs are used as gates. If high frequency is not provided, the second current source will have a high open circuit voltage to facilitate the transition from the forward to reverse directions. One disadvantage of this approach is increased hardware, which increases cost and complexity. Another disadvantage is that the reverse current is greater than the forward current.

It has also been suggested that a single current source be used together with a reversing switch. A reversing switch may comprise SCRs (Silicon Controlled Rectifiers) to change polarity of the output. To maintain an electric arc and obviate possible difficulties in re-establishing the arc when the current passes through a null point, it has been suggested that a surge injector unit be provided to fire a pulse of energy on the transition from forward current to reverse current. The timing of the surge injector is synchronized with the timing of the reversing switch by a timer such that it delivers a pulse of current during the transition period when the system is switching between the positive and negative pulses.

SCRs have been used as switches because they are substantially unresponsive to voltage transients across their output that may affect other types of switches. However, one disadvantage of the devices that use SCRs is that the SCRs switch off relatively slowly compared to other types of semiconductor switches such as bipolar junction transistors (BJTs), and also compared to field effect transistors (FETs). Although SCRs switch on quickly, to switch off a SCR requires a substantial amount of current in the reverse direction. Thus, to switch off the SCRs quickly, commutating circuits have been designed that increase the magnitude of this reverse current.

Thus, there is a need for a quickly switching, economical power supply with a high open circuit voltage with a minimum of additional hardware.

As an additional constraint upon the power supply, the current in the reverse direction should be substantially limited to reduce damage to the torch electrode and thereby to decrease the useful life of the torch electrode due to heat. Ideally, the current in the reverse direction should have a magnitude and duration long enough to cleanse the workpiece, but short enough that the heating of the torch electrode due to electron bombardment is minimized. It is desireable to reduce heating of the torch electrode because the useful life of the torch electrode is substantially shortened by excessive heat.

SUMMARY OF THE INVENTION

The present invention provides a variable polarity power supply for arc welding that quickly switches between polarities in order to more easily re-establish the arc. In addition, the variable polarity power supply of the present invention includes a current-limited boost circuit that increases the open circuit voltage at times when the additional voltage is necessary to re-establish the arc, while limiting the current involved with this re-establishment. The additional voltage is necessary because it has been found that oxides built on the surface of the workpiece during the welding process act like a diode, permitting current flow in one direction, while preventing current flow in the other direction. Because of this, when polarity is reversed, current flow in the reverse direction is substantially impeded. In order to break through, and establish current in the reverse direction, application of a large voltage is necessary.

The power supply of the present invention has particular application in arc welding, where such a variable polarity power supply can be applied to make substantially defect-free welds. For example, the present invention may be advantageously used as a power supply for DC Gas Tungsten Arc Welding (GTAW) and Plasma Arc Welding (PAW). The present invention is suitable for applications of computer-controlled welding, for example in assembly lines, because the present invention can periodically re-start the arc in either direction without using high frequency radiation which would generate electromagnetic interference (EMI) and could adversely affect computer operation. As an additional advantage for computer-controlled welding, the present invention provides quick switching times and the capability of providing a low reverse current that reduces heat in the torch electrode, thereby increasing longevity of the torch electrode and reducing unproductive time while the torch electrode is being replaced.

To increase the open circuit voltage, the present invention provides a boost switch that turns on an energy storage device when a loss of arc is detected. In the preferred embodiment, the switch includes a zener diode that senses the voltage increase on the output lines, and actuates a plurality of transistors that apply the output of the energy storage device to the output. In the preferred embodiment, the energy storage device comprises a capacitor charged to a high voltage, which is applied to the output when the boost switch is actuated.

To switch polarities, the present invention comprises a plurality of transistors such as power MOSFETs connected in an H-bridge configuration. Each of the four legs of the H-bridge comprises a switch including a plurality of MOSFETs connected in a parallel bank. It will be obvious to one skilled in the art that other semiconductor devices may also be used such as Darlington transistors, Insulated Gate Bipolar Transistors (IGBT) and MOS-Gate Bipolar Transistors (MBT). A pair of the switches, when actuated, provide current in the forward direction, and the other pair of switches, when actuated, provide current in the reverse direction. Overload protection is provided to each bank of switches.

The four switches of the H-bridge are each actuated respectively by a MOSFET driver. Each driver is controlled by a comparator circuit. The comparator circuit is connected so that the four switches operate in pairs; i.e., so that actuation of the forward switches causes the reverse switches to be de-actuated, and conversely, so that actuation of the reverse switches causes the forward switches to be de-actuated. The comparator circuit is responsive to a reverse command generated in conventional digital circuitry. The preferred embodiment of the present invention provides isolation of the comparator circuit from the H-bridge switches, and also provides isolation of the digital circuitry generating the reverse command from the remainder of the circuit.

DETAILED DESCRIPTION OF THE PREFERRED EMBODIMENT

The power supply of the present invention is designed to switch between polarities quickly. Further, the power supply of the present invention provides current-limited voltage pulses to effectively increase the open circuit voltage without increasing the total current. The power supply of the present invention has particular application in arc welding, where such a variable polarity power supply can be applied to make substantially defect-free welds. For example, the present invention may be used as a power supply for DC Gas Tungsten Arc Welding (GTAW) and Plasma Arc Welding (PAW).

A welder using the power supply of the present invention can adjust the current in order to give the amount of heating desired in the workpiece. The welder can also adjust the current, frequency and duration of the reverse polarity current to be often enough and long enough to effectively clean the weld of oxides, while at the same time avoiding destructive heat buildup within the torch. The present invention is suitable in applications of computer-controlled welding, for example in assembly lines, because the present invention can periodically re-start the arc in either direction without using high frequency radiation which would generate electromagnetic interference (EMI) and could adversely affect computer operation. As an additional advantage for computer-controlled welding, the present invention provides quick switching times and the ability to provide a low reverse current that reduces heat in the torch, thereby increasing longevity of the torch and reducing unproductive time while the torch is being replaced.

It has been found that the present invention can be used to provide very high quality oxide free welds in the titanium alloys used in aircraft construction, with a quality that is not feasible with other power supplies currently available.

Figure 1A:
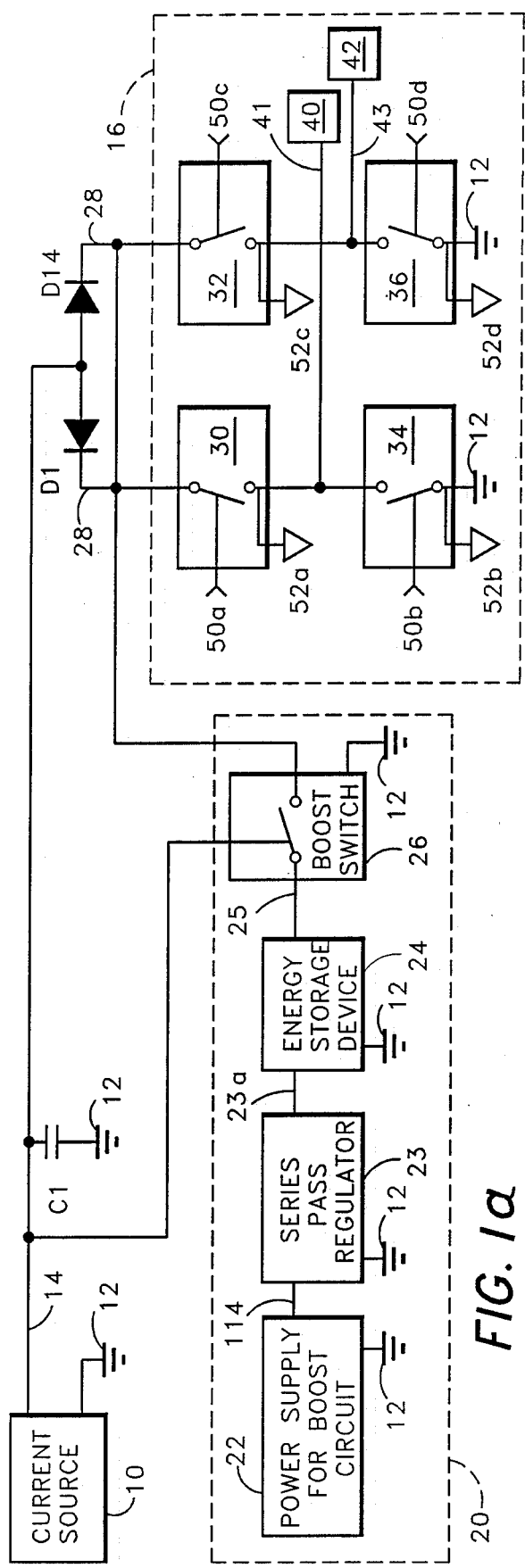
FIGS. 1a, 1b, and 1c illustrate a block circuit diagram of the welding power supply of the present invention.
Figure 1B:
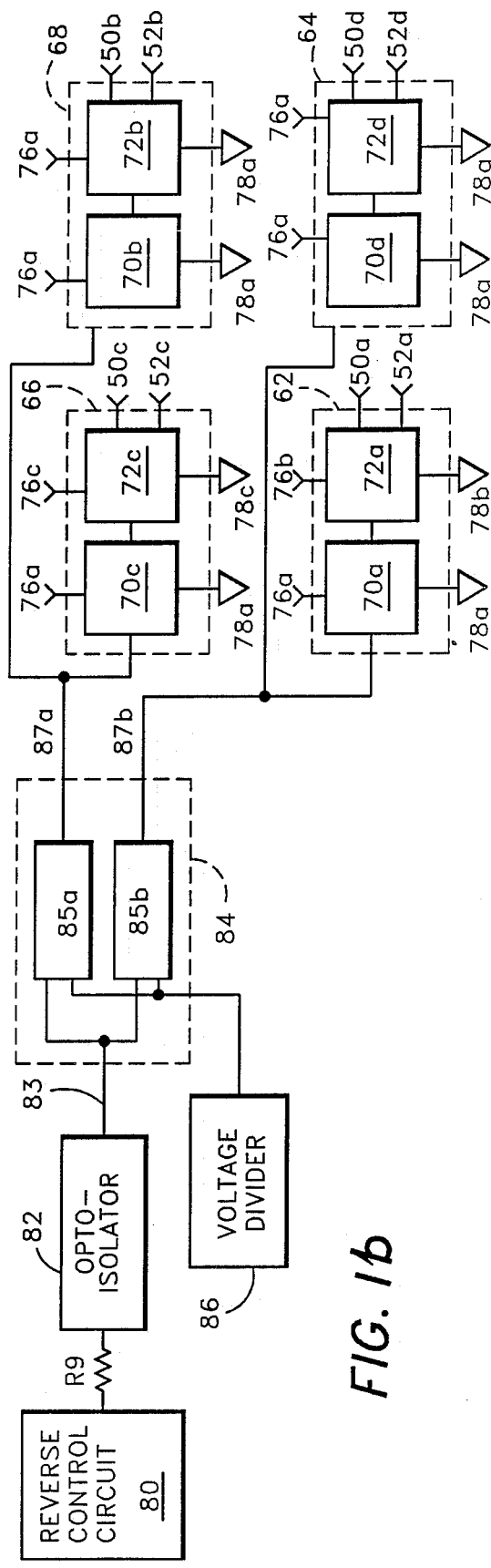
Figure 1C:
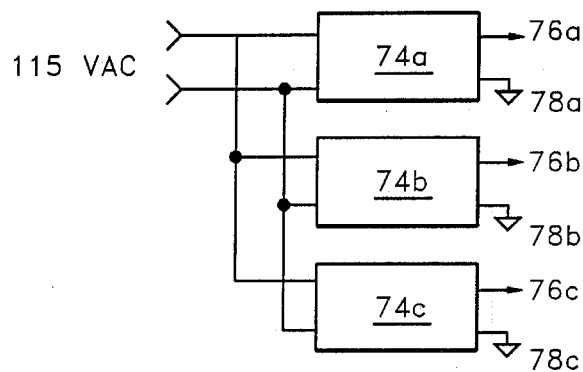

The invention is best understood by reference to the figures wherein like parts are designated with like numerals throughout FIGS. 1a, 1b, and 1c illustrate a circuit diagram of the present invention in block form. Between FIGS. 1a, 1b, and 1c, the blocks are connected with like-labelled lines.

Referring first to FIG. 1a, the preferred embodiment includes a unidirectional current source 10. The current source 10 may, for example comprise one or more commercially available current sources such as the Pulsweld P200 manufactured by Venable Industries, Inc., Torrance, Calif., which may be connected to a conventional power main, such as 115 VAC or 230 VAC. The Pulsweld P200 can provide from 0.1 ampere to 200 amperes, and has an open circuit voltage of about 65 volts. Each Pulsweld P200 may be connected in any conventional manner to provide greater current levels. It will be apparent to one skilled in the art that other high performance current sources may be substituted for the Pulsweld P200 current source.

The two outputs of the current source 10 are shunted by a capacitor C1. Capacitor C1 is preferably 5µF rated at 200 V. The negative pole of the current source is connected to a ground reference 12. The positive pole of the current source, on a line 14, is connected to the anodes of diodes D1,D14. Diodes D1,D14 are each advantageously part number SWO6PHN400. The cathodes of the diodes D1,D14 are connected to a polarity switching network 16 on a line 28.

An open circuit voltage (OCV) boost circuit 20 is connected to the output line 14 of the current source 10, and also to the line 28 which connects the cathodes of the diodes D1,D14 to the polarity switching network 16. The OCV boost circuit 20 includes a power supply 22 connected to a series pass regulator 23 which serves as a voltage regulator and which is in turn connected by a line 23a to an energy storage device 24. A boost switch 26 is connected to the energy storage device 24 by a line 25. The switch 26, responsive to the voltage between the anodes of the diodes D1,D14 on line 14 and ground 12, selectively connects the energy storage device 24 to the line 28 which is connected to the cathodes of the diodes D1,D14, and also connected to the polarity switching network 16. The switch 26, when open, allows accumulation of energy from the power supply 22 in the energy storage device 24. When the switch 26 is closed, the stored energy within the stored energy device 24 is applied to the line 28, and is therefore applied to the polarity switching network 16.

The purpose of the polarity switching network 16 is to reverse the polarity of the output that is provided to a workpiece 40 on an output 41 and to a torch 42 on an output 43. The workpiece 40 may comprise any material to be welded, such as aluminum, and the torch 42 may comprise any conventional torch used in arc welding. The polarity switching network 16 comprises an H-bridge configuration, and includes four switches: a forward positive switch 30, a reverse positive switch 32, a reverse ground switch 34, and a forward ground switch 36. The structure of these switches will be described further with reference to FIG. 5.

The switches 30,32,34,36 operate in pairs. The two forward switches 30,36, act as a pair which when activated simultaneously operate to provide forward current, and similarly, the two reverse switches 32,34 act as a pair which when activated simultaneously operate to provide a reverse current. More specifically, when the switches 30,36 are closed, the forward positive switch 30 connects the line 28 to the workpiece 40, while the forward ground switch 36 connects the torch 42 to ground 12. Similarly, when the switches 32,34 are closed, the reverse positive switch 32 connects the torch 42 to the line 28, while the reverse ground switch 34 connects the workpiece 40 to the ground 12. It will be apparent to one skilled in the art that short circuits will be avoided if one pair of switches is open while the other pair is closed.

Figure 2:
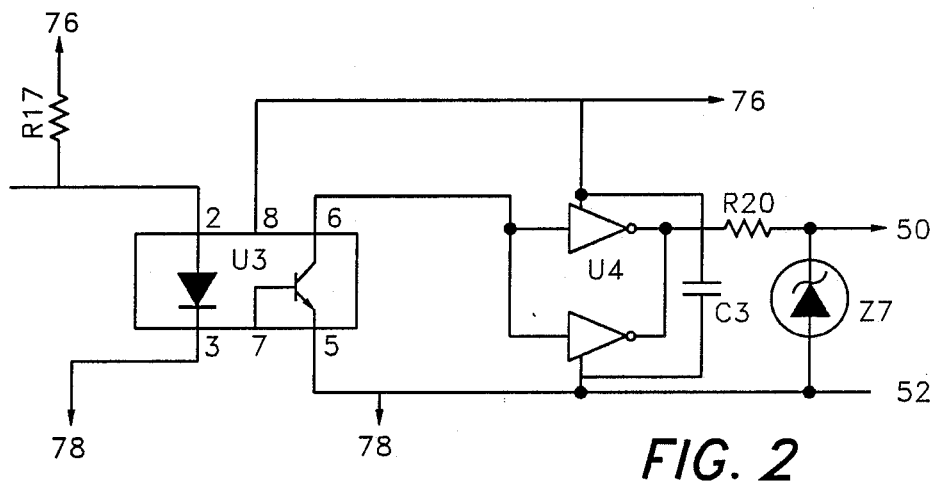
FIG. 2 shows a detailed driver circuit of the preferred embodiment of the present invention.

The switches 30,32,34,36 are each responsive to a signal from drivers 62,64,66,68 shown in FIG. 1b. Specifically, the forward positive switch 30 is coupled to a first driver 62 by means of a line 50a and a reference line 52a, the forward ground switch 36 is coupled to a second driver 64 by means of a line 50d and a reference line 52d, the reverse positive switch 32 is coupled to a third driver 66 by means of a line 50c and a reference line 52c, and the reverse ground switch 34 is coupled to a fourth driver 68 by means of a line 50b and a reference line 52b. Each driver 62,64,66,68 comprises an isolator circuit 70 (shown as 70a, 70b, 70c, 70d) and a driving circuit 72 (shown as 72a, 72b, 72c, 72d). A circuit diagram of the preferred embodiment, identical for each driver, is illustrated in FIG. 2. In the preferred embodiment, exemplary values of the components and exemplary parts numbers are as follows: resistor R17 is advantageously 680Ω, resistor R10 is advantageously 10Ω, capacitor C4 is advantageously 1 μF and is rated at 50 V. Exemplary part numbers for commercially available chips U3 and U4 are HCPL-2212 and TSC4426, respectively, and the diode Z7 is advantageously part number 1N965B. The isolator circuits 70 comprise conventional opto-isolators, and the driving circuits 72 comprise conventional FET driving circuitry, and it will be apparent to one skilled in the art that other isolator circuits and other driving circuits may be substituted readily for the opto-isolators and the driving circuits of the preferred embodiment. The isolators 70 are provided for purposes including electrical separation of the switches 30,32,34,36 and the driving circuits 72 from the control circuitry. Because the switches 30,32,34,36 are subject to large voltage fluctuations it is desirable to isolate the control circuitry to protect it against possible large voltage fluctuations.

Figure 3:
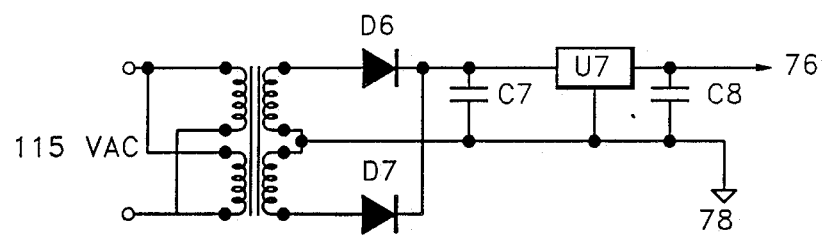
FIG. 3 shows a preferred embodiment of one of three identical power supplies for the driver circuit.

The power supplies for the circuit illustrated in FIG. 1b are illustrated in FIG. 1c. A first rectifying circuit 74a having a positive output 76a and a ground reference 78a, a second rectifying circuit 74b having a positive output 76b advantageously 12 volts and a ground reference 78b, and a third rectifying circuit 74c having a positive output 76c and a ground reference 78c, are each connected to conventional alternating current mains such as 115 VAC. In the preferred embodiment, the rectifying circuits 74 are identical in construction, and provide smooth, regulated voltages. A detailed circuit diagram of the preferred embodiment of the rectifying circuits 74 is illustrated in FIG. 3. In the preferred embodiment, capacitor C7 advantageously has a value of 150 μF rated at 35 V, capacitor C8 advantageously is 0.1 μF rated at 100 V, chip U7 is advantageously part number 7812 and diodes D6 and D7 are both advantageously part number 1N4002.

The outputs 76 and the ground references 78 respectively provide power and ground where indicated to the circuits of FIGS. 1a and 1b. The output 76a and the ground reference 78a are connected to the isolator circuits 70, and also are connected to the driving circuits 72b,72d. The output 76b and reference 78b are connected to the driving circuit 72a, and the output 76c and reference 78c are connected to the driving circuit 72c.

The drivers 62,64,66,68 are responsive to a signal from a reverse control circuit 80, which may for example comprise a computer, or a timer, or other digital hardware or analog circuits. In the preferred embodiment, the reverse command comprises a one bit digital signal that is first applied to an opto-isolator 82; a digital low signal produces a forward current, and a digital high signal produces a reverse current. One function of the opto-isolator 82 is to electrically isolate the computer hardware and other easily damaged components from exposure to large voltages and currents.

Figure 4:
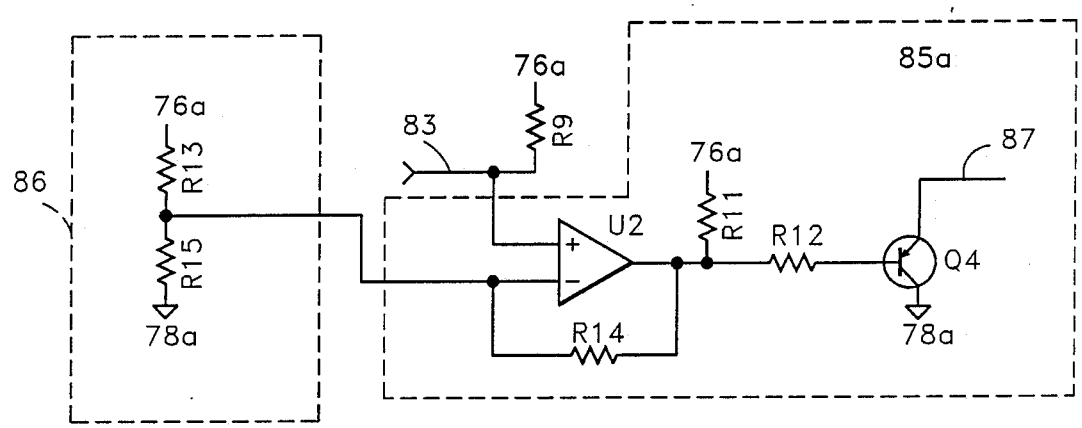
FIG. 4 illustrates the comparator circuit of the preferred embodiment of the present invention.

An output 83 of the opto-isolator 82 is provided to a comparator circuit 84, which compares the output 83 with a voltage provided by a voltage divider 86 on an output line 87. The comparator circuit 84 comprises two substantially identical subcircuits 85a,85b. A detailed circuit diagram of the subcircuit 85a is shown in FIG. 4. The only differences between subcircuits 85a and 85b are that the noninverting and inverting outputs are reversed and there is no corresponding resistor to resistor R14 in subcircuit 85b. In the preferred embodiment, exemplary values are as follows: resistor R9 is advantageously 15kΩ, resistor R11 is advantageously 47kΩ, resistor R12 is advantageously 100Ω and resistor R14 is advantageously 100kΩ. Transistor Q4 is advantageously part number 2N2907A and chip U2 is advantageously part number LM339.

If the opto-isolator output 83 is a low value, i.e., it has a voltage lower than that of the voltage divider 86 output, then the comparator circuit 84 produces a high digital output on a line 87b which is provided to both the first driver 62 and the second driver 64, which causes the forward switches 30,36 to be closed. At the same time, the comparator circuit 84 produces a low voltage on a line 87a which is provided to the third driver 66 and to the fourth driver 68, causing the reverse switches 32,34 to be open.

Thus, with the output 83 being low, current flows in the forward direction through the workpiece 40 and the torch 42, because the forward switches 30,36 are closed and the reverse switches 32,34 are open. If, on the other hand, the opto-isolator output 83 is high, i.e., it has a higher voltage than the voltage divider 86 output, then the comparator circuit outputs 87a,87b are reversed. The result is that current will flow in the reverse direction because the forward switches 30,36 are open, and reverse switches 32,34 are closed. Because the forward switches 30,36 are closed substantially simultaneously with the opening of the reverse switches 32,34, the possibility of a short circuit is precluded.

Figure 5:
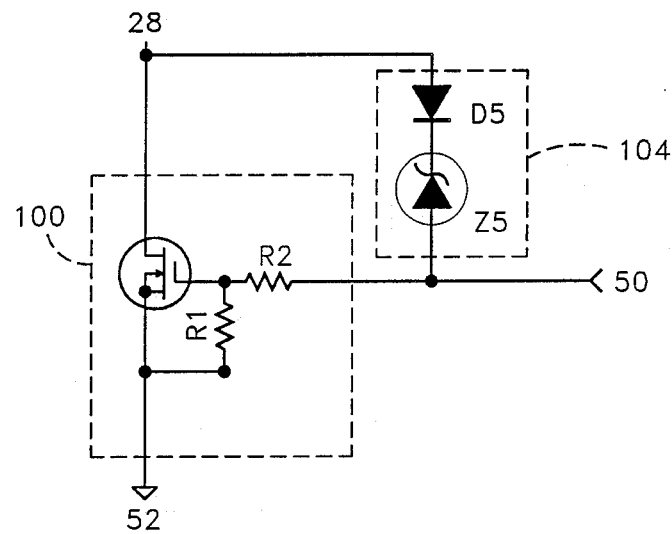
FIG. 5 illustrates one of four identical polarity switches for the preferred embodiment of the present invention.

The polarity switching network 16 comprises a plurality of Field Effect Transistor (FET) circuits, shown on FIG. 5 at 100. These FET circuits are selected to be of a type and quantity sufficient to conduct the magnitude of current desired. In the preferred embodiment, each of the switches 30,32,34,36 comprise a bank of six MOSFET circuits, advantageously part number BSM121 connected in parallel. FIG. 5 illustrates the connection of one of the MOSFET circuits, and indicates that, typically six MOSFET circuits should be placed in parallel. The switches 30,32,34,36 also comprise an overload protection circuit 104, comprising a zener diode Z2, and a diode D2, the diodes Z2,D2 being mutually connected at their cathodes. The overload protection circuit 104 is connected between the drain and the gate of each transistor 100. Each switch 30,32,34,36 comprises one overload protection circuit 104 coupled to the bank of its transistor circuits 100. In the preferred embodiment, exemplary part numbers of diode D5 and zener diode Z5 are advantageously part numbers 1N3600 1N1506, respectively, and resistor values for R1 and R2 in the transistor circuits 100, are advantageously 10kΩ and 2Ω, respectively.

Thus, through the polarity switching network 16, which is controlled by a single bit from the reverse control circuit 80, the polarity on the output lines 41,43 may be quickly and conveniently switched. The act of polarity switching of course assumes that the input to the network 16 on the line 28 has a difference in polarity from the ground 12. This will always be true if there is a voltage difference between the voltage on the line 28 and the ground 12. In the preferred embodiment, the current source 10 is configured so that the output line 14 is more positive than the ground 12, and as a result, the line 28 will typically be more positive than the ground 12. When the forward switches 30,36 are closed so that current is flowing in the forward direction, the output 41 is more positive. Specifically, this result occurs because the voltage on the switching network line 41 is directly related to the voltage on the line 28, and the voltage on the line 43 is directly related to the ground 12. Following the transition wherein polarity has been switched to reverse the direction of current flow, the outputs 41,43 are exchanged, so that the output 41 is now more positive. If a current path between the outputs 41,43 exists, then current will flow in the reverse direction through these outputs 41,43, although the current source 10 has not changed polarity.

However, in the arc welding environment, a current path may not always be present. Specifically, in the preferred embodiment the current path between the outputs 41,43 is an arc comprising electrons flowing in one direction between the workpiece 40, and the torch 42. Upon polarity reversal, an arc must be established having electron flow in the opposite direction, or the arc will extinguish and no current will flow. It is known that an arc is actually a plasma of ions and electrons, and that the plasma exists for several milliseconds following removal of the current source. Thus, if the current is switched quickly enough, the plasma still present will substantially aid in re-establishing the arc. Nevertheless, quick switching is often not enough.

In addition to quick switching, it is advantageous or even necessary to apply an additional voltage to enhance the open circuit voltage of the current source 10. It has been found that the oxide built up on the surface of the workpiece 40 acts like a diode, permitting current flow in one direction, while preventing current flow in the other direction. This "diode" is built of oxides during the time while current is flowing in the forward direction. When polarity is reversed, the "diode" substantially impedes reverse current flow. In order to break through the "diode", application of a voltage in excess of the "reverse breakdown voltage" is necessary. Typically, the reverse breakdown voltage of this "diode" is greater than the open circuit voltage of the current source 10. For example, a voltage of 190 volts may be necessary to breakdown the diode, while the open circuit voltage (OCV) of a 200 ampere high performance current source, for example, is about 65 volts. As a result, upon reversal the current source 10 by itself cannot provide a voltage output on the line 13 sufficient to break down the "diode". Therefore, without the benefit of the boost circuit 20, the current source 10 will increase its output voltage up to the OCV value. The current source 10 will attempt to maintain a constant current, but because it cannot provide the necessary voltage, no reverse current will flow. The boost circuit 20 of the present invention is designed to provide, for short intervals, the voltage necessary to break through the "diode" and re-establish the arc.

Figure 6:
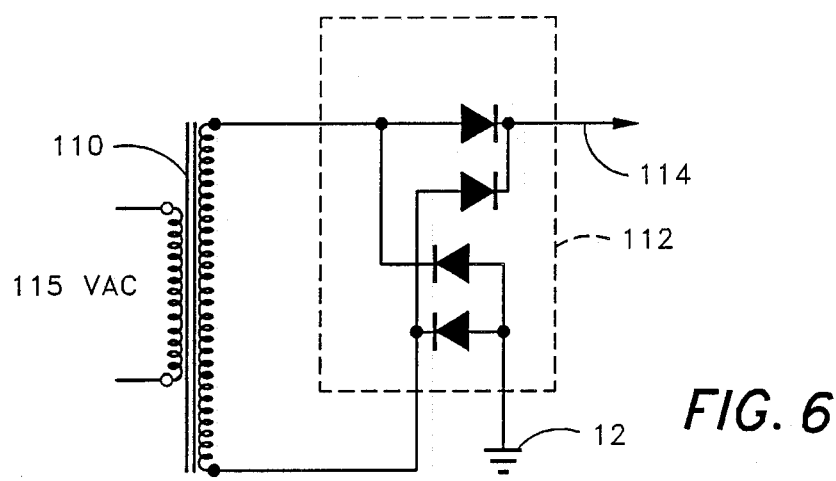
FIG. 6 illustrates the power supply for the boost circuit of the preferred embodiment of the present invention.

As previously described with reference to FIG. 1a, the boost circuit 20 of the present invention includes the power supply 22, the series pass regulator 23, the energy storage device 24, and the switch 26. The power supply 20 is illustrated in more detail in FIG. 6, and includes a transformer 110 coupled to a conventional power source such as 115 VAC. The transformer 110 has outputs connected to a conventional rectifier 112, advantageously part number SCBA4. An output 114 of the rectifier 112 is coupled through the series pass regulator 23 to the energy storage device 24 and also to the boost switch 26.

Figure 7:
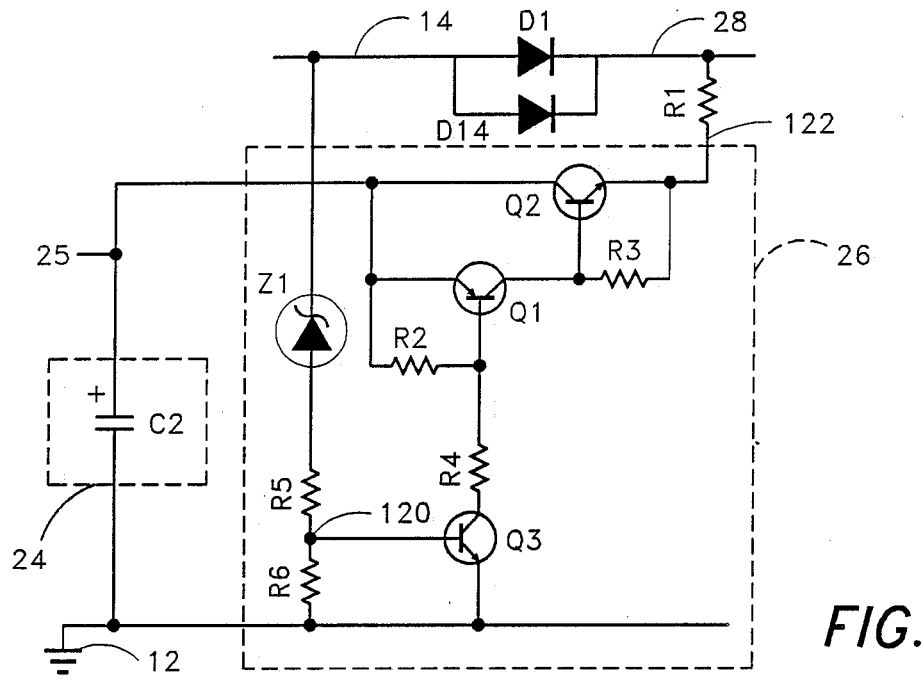
FIG. 7 shows a detailed circuit diagram of the energy storage device and the boost switch of the preferred embodiment.
Figure 8:
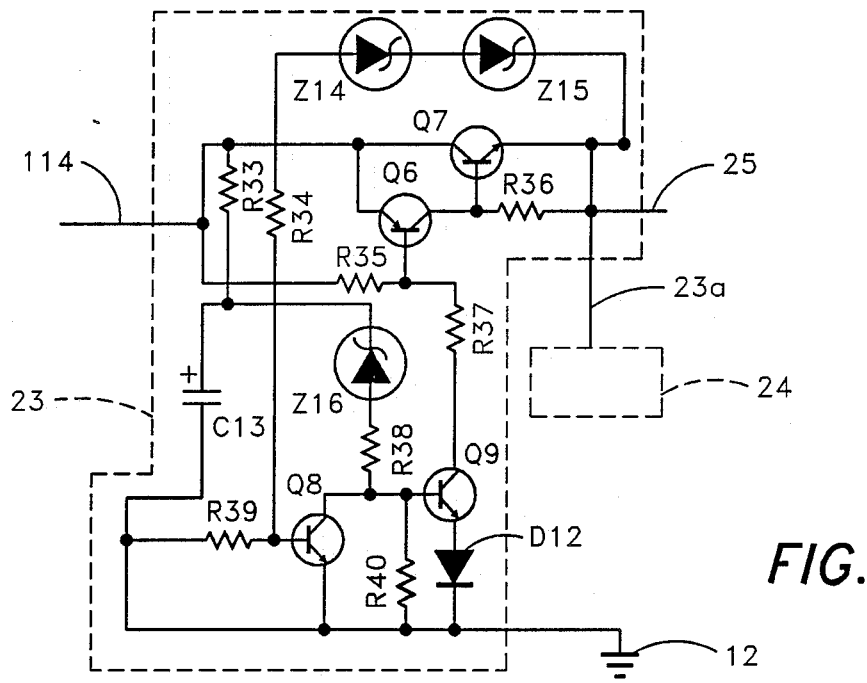
FIG. 8 shows a detailed circuit diagram of the series pass regulator of the preferred embodiment of the present invention.

Referring now to FIGS. 7 and 8, the preferred embodiments of the energy storage device 24 and the boost switch 26, and the series pass regulator 23 are shown in more detail. The energy storage device 24 comprises a capacitor C2 connected on one side to the lines 25,23a and on the other side to ground 12. The capacitor C2 advantageously has a value of 2700 µF. The series voltage regulator 23 regulates the voltage on line 23a to the capacitor C2 at a particular voltage in a manner known to one skilled in the art. This particular voltage may be anywhere within the range of 200 and 230 volts. In the preferred embodiment the voltage is maintained preferably at 230 volts. With reference to FIG. 8, exemplary values and part numbers for the components are advantageously as follows: the resistor R33, 100kΩ, resistor R34, 4.7kΩ, resistor R35, 10kΩ, resistor R36, 100Ω, resistor R37, 47kΩ, resistor R38, 47kΩ, resistor R39 and resistor R40, 10kΩ, capacitor C13, 47 µF rated at 35 V, diode D12 part number 1N4002, diode Z14 part number 1N992A, diode Z15 part number 1N774A and diode Z16 part number 1N963A, transistor Q6 part number 2M6313, transistor Q7 part number MJ11022, transistor Q8 part number 2N2222 and transistor Q9 part number 2N3439. Application of the energy stored in capacitor C2 to the line 28, and ultimately, application of the energy to the workpiece 40 and the torch 42, is controlled by the boost switch 26. When the boost switch 26 is open, electrical charge supplied by the power supply 22 can accumulate on the capacitor C2, thereby storing energy. When the boost switch 26 is closed, the stored energy is applied to the line 28, which is coupled to the workpiece 40 and the torch 42. The length of time during which the stored energy is applied can vary, depending on the extent of plasma present and the amount of oxide buildup. The computer controlled period for current in the forward direction is typically in the range of 15-25 milliseconds. The period for current in the reverse direction is typically in the range of 2-4 milliseconds. In the preferred embodiment, the stored energy is generally applied for a very short period of time, typically less than one tenth of a millisecond. The exact amount of time that the energy boost is applied depends on the voltage level on line 14.

The switch 26, which is responsive to the voltage between the output line 14 of the current source 10 and ground 12, is shown is more detail in FIG. 7. A zener diode Z1 is coupled at its cathode to the output line 14 of the current source 10. The zener diode Z1 may advantageously be part number 1N4480. The anode of the zener diode Z1 is coupled to ground 12 through a resistor R5 and a resistor R6, connected in series, which may advantageously have values of 10kΩ and 1kΩ, respectively. The base of a transistor Q3 is connected to a line 120 extending between the resistors R5,R6. The transistor Q3 may advantageously be a Bipolar Junction Transistor (BJT), with part number 2N3439. The emitter of the transistor Q3 is connected to the ground 12. The collector of the transistor Q3 is coupled to the base of a transistor Q1 through a resistor R4 which preferably has a resistance of 15kΩ. The base of the transistor Q1, advantageously part number MJ15025, is also coupled to the line 25 through a resistor R2 which preferably has a resistance of 1kΩ. The emitter of the transistor Q1 is connected to the line 25, and the collector of the transistor Q1 is connected to the base of a transistor Q2, preferably part number MJ10016. The collector of the transistor Q2 is connected to the line 25, and its emitter is connected to a switch output line 122. The base of the transistor Q2 is also coupled to the switch output line 122 through a resistor R3, which advantageously has a resistance of 1kΩ. The switch output line 122 is coupled to the line 28 through a current limiting resistor R1. Resistor R1 may advantageously be 4Ω.

In operation, the zener diode Z1 senses the loss of arc by sensing the voltage on the output line 14 from the current source 10. If it senses a high voltage level, particularly if the voltage is approaching the OCV of the current source 10, this indicates that there is no current flowing between the workpiece 40 and the torch 42. When the zener diode Z1 senses a high voltage, approximately 45 volts in the preferred embodiment, current immediately flows through the zener diode Z1, the resistor R5, and the resistor R6. This causes the transistor Q3 to turn on, which brings the base of the transistor Q1 lower than its emitter, causing the transistor Q1 to become conducting. With the transistor Q1 conducting, the base of the transistor Q2 is pulled high, causing the transistor Q2 to become conducting. When the transistor Q2 is conducting, the energy stored in the capacitor C2 is available on the switch output line 122. In the preferred embodiment, the capacitor C2 has a voltage of 230 volts when fully charged. This voltage is applied to the line 122. When the arc starts conducting again, current initially flows from the capacitor C2. In the preferred embodiment, the current is limited by the resistor R1, which has a resistance selected to provide approximately 35 amperes. Current limitation in the reverse direction is desireable because it reduces the amount of heat applied to the torch 42. In the preferred embodiment, 35 amperes is needed to quickly drive the voltage of the arc down to a voltage below the OCV of the current source 10, so that the current source 10 can take over and provide the desired current.

After the arc is conducting, due to its negative resistance characteristics, the arc voltage rapidly drops as current flow increases. When the arc voltage drops, the voltage on the line 28 and the line 14 also drops. When the voltage on the line 14 drops to the level at which the zener diode Z1 stops conducting the transistors Q1, Q2, and Q3 to switch off. It should be apparent to one of ordinary skill in the art that other methods of sensing loss of arc may be used instead of the voltage sensing method utilized in the preferred embodiment. In addition, after the boost circuit has accomplished its purpose, the current in the reverse is determined by the current source 10. In the preferred embodiment the current source 10 can be advantageously programmed to provide any level of current that may be suitable under the circumstances.

In summary, the boost switch 26 is responsive to a high voltage output from the current source 10, which indicates that current flow has stopped. Typically, current flow stops during reversal of polarities. Immediately upon sensing the rising voltage, the zener diode Z1 conducts, causing the stored energy to be applied to the switch output 122. During the time that the stored energy is applied, the current is limited by a resistor R1 which prevents excessive heat buildup on the torch 42 while allowing sufficient current to bring the voltage of the arc down to a level that the current source 10 can maintain. When the zener diode Z1 senses the voltage drop, the boost switch 26 opens and the current source 10 provides all applied current. After the boost switch is open, the capacitor C2 recharges to await the next time its stored energy is needed.

The boost switch 26 applies the additional voltage from the energy storage device 24 whenever needed, whether it is needed on a transition from forward current to reverse current to cleanse the workpiece 40, or on a transition from reverse current to forward current to resue welding, or on any temporary discontinuity in current flow through the workpiece 40 and torch 42 for whatever reason.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A variable polarity power supply for welding, said power supply having a first output applied to a workpiece, and having a second output applied to a torch, said power supply having a current source for providing current in the forward direction and in the reverse direction said power supply comprising:
   a control circuit for controlling the polarity of the first and the second outputs of the power supply;
   a plurality of drivers connected to the control circuit;
   a switching circuit for switching polarity of the power supply so that the polarity of the first output is switched with the polarity of the second output, said polarity switching circuit being responsive to the drivers;
   a boost circuit for significantly increasing the open circuit voltage and the power applied between said workpiece and said torch by the power supply in response to an increase in the voltage on said current source output.

2. The power supply of claim 1, further comprising an energy storage device and a switch, said energy storage device being responsive to the switch, so that said energy storage device stores energy while the switch is open, and releases energy to the power supply outputs when the switch is closed.

3. The power supply of claim 2, wherein said energy storage device includes a capacitor.

4. The power supply of claim 2, wherein said switch includes a zener diode.

5. The power supply of claim 1, wherein said polarity switching circuit comprises a plurality of power semiconductor devices for switching the polarity of the first and the second outputs.

6. The power supply of claim 5, wherein said polarity switching circuit comprises a pair of forward switches actuated when current in the forward direction is applied, and a pair of reverse switches actuated when current in the reverse direction is applied.

7. The power supply of claim 6, further including a control circuit comprising a reverse control circuit that generates the reverse command, and a comparator circuit for sensing the reverse command and generating a signal actuating one of the pairs of switches and substantially simultaneously de-actuating the other pair of switches.

8. A method for variable polarity arc welding by applying a variable, reversible voltage between a torch and a workpiece for providing current for a current source, said method comprising the steps of:
   first, applying a voltage between the torch and workpiece so that current flows between the torch and the workpiece;
   second, reversing the polarity of said voltage;
   third, substantially simultaneously with the second step, monitoring the absolute value of the voltage on said current source output; and
   fourth, if the absolute value of said voltage rises above a selected level, significantly increasing the open circuit voltage and the power applied between the torch and the workpiece.

9. A method of variable polarity arc welding as defined in claim 8, additionally comprising the step of:
   fifth, substantially simultaneously with increasing said open circuit voltage in said fourth step, limiting the current that can flow at that open circuit voltage so that the average reverse current is less than the average forward current, and the magnitude of the reverse current at any time will not be greater than the magnitude of the forward current at any time.

10. A variable polarity power supply, said power supply having a first output and a second output, said power supply having a current source for providing current in the forward direction and in the reverse direction said power supply comprising:
    a switching circuit for switching polarity of the power supply so that the polarity of the first output is switched with the polarity of the second output;
    a circuit for controlling the switching circuit;
    a current limited boost circuit for significantly increasing the open circuit voltage and the power applied between said workpiece and said torch by the power supply in response to an increase in the voltage of said current source output.

11. The power supply of claim 10, wherein said boost circuit comprises an energy storage device and a boost switch responsive to the voltage of said current source output.

12. The power supply of claim 11, wherein said boost switch comprises a zener diode responsive to the voltage of said current source output.

13. The power supply of claim 11, wherein said energy storage device comprises a capacitor.

14. The power supply of claim 13, comprising a resistor for limiting the current flowing from the energy storage device.

15. The power supply of claim 10, wherein said polarity switching network comprises a plurality of MOSFETs, and said control circuit comprises a plurality of MOSFET drivers.

16. The power supply of claim 15, wherein said MOSFETS are configured in an H-bridge configuration.

17. The power supply of claim 10, wherein said control circuit comprises an opto-isolator.

18. A variable polarity power supply for welding, said power supply having a first output applied to a workpiece, and having a second output applied to a torch, said power supply having a current source for providing current for establishing and re-establishing an arc in forward and reverse directions, said power supply comprising:
    a control circuit for controlling the polarity of the first and the second outputs of the power supply;
    a plurality of drivers connected to the control circuit;
    a switching circuit for switching polarity of the power supply so that the polarity of the first output is switched with the polarity of the second output, said polarity switching circuit being responsive to the drivers;
    a boost circuit for significantly increasing the open circuit voltage and the power applied between said workpiece and said torch by the power supply in response to sensing a loss of said arc.

19. A variable polarity power supply for welding, said power supply having a first output applied to a workpiece, and having a second output applied to a torch, said power supply comprising:
    a current source for providing current in the forward direction for establishing an arc for a first predetermined length of time, and said current source providing current in the reverse direction for re-establishing said arc for a second predetermined length of time;

a boost circuit for significantly increasing the open circuit voltage and the power applied between said workpiece and said torch by the power supply in response to a loss of said arc.

20. A variable polarity welding power supply as defined in claim 19, wherein said boost circuit increases said open circuit voltage for a period of time less than or equal to 2.5% of said second predetermined length of time.

21. A variable polarity welding power supply as defined in claim 19, wherein said boost circuit increases said open circuit voltage for a period of time less than or equal to 5% of said second predetermined length of time.

22. A variable polarity power supply, said power supply having a first output and a second output, said power supply having a current source for providing current in a first direction during a first predetermined period of time, and said current source of said power supply providing current in a second direction during a second period of time, said power supply comprising:

a control circuit for controlling the polarity of the first and the second outputs of the power supply;
a plurality of drivers connected to the control circuit;
a switching circuit for switching polarity of the power supply so that the polarity of the first output is switched with the polarity of the second output, said polarity switching circuit being responsive to the drivers;
a boost circuit for significantly increasing the open circuit voltage and the power applied between said first and second outputs by the power supply for a third period of time less than said second period of time in response to an increase in the voltage on said current source output.

23. A variable polarity power supply as defined in claim 22, wherein said third period of time is less than said second period of time by less than 5% of said second predetermined length of time.

24. A method for variable polarity arc welding by applying a variable, reversible voltage between a torch and a workpiece for providing current for a current source, said method comprising the steps of:

first, applying a voltage between the torch and workpiece so that current flows between the torch and the workpiece;
second, reversing the polarity of said voltage;
third, substantially simultaneously with the second step, monitoring the absolute value of the voltage on said current source output;
fourth, if the absolute value of said voltage rises above a selected level, increasing the open circuit voltage; and
fifth, substantially simultaneously with increasing said open circuit voltage in said fourth step, limiting the current that can flow at that open circuit voltage so that the average reverse current is less than the average forward current, and the magnitude of the reverse current at any time will not be greater than the magnitude of the forward current at any time.

25. A variable polarity power supply, said power supply having a first output and a second output, said power supply having a current source for providing current in the forward direction and in the reverse direction, said power supply comprising:

a switching circuit for switching polarity of the power supply so that the polarity of the first output is switched with the polarity of the second output;
a circuit for controlling the switching circuit;
a current limited boost circuit for significantly increasing the open circuit voltage of the power supply, said boost circuit being responsive to the voltage of said current source output; and
means for limiting the current from said current limited boost circuit that can flow at the open circuit voltage so that the average reverse current is less than the average forward current, and the magnitude of the reverse current at any time will not be greater than the magnitude of the forward current at any time.

26. A method for variable polarity arc welding by applying a variable, reversible voltage between a torch and a workpiece for providing current for a current source, said method comprising the steps of:

first, applying a voltage between the torch and workpiece so that current flows between the torch and the workpiece;
second, reversing the polarity of said voltage;
third, substantially simultaneously with the second step, monitoring the absolute value of the voltage on said current source output; and
fourth, if the absolute value of said voltage rises above a selected level, significantly increasing the power applied between the torch and the workpiece by applying a DC voltage.

27. A variable polarity power supply for welding, said power supply having a first output applied to a workpiece, and having a second output applied to a torch, said power supply comprising:

a current source for providing current in the forward direction for establishing an arc for a first predetermined length of time, and said current source providing current in the reverse direction for re-establishing said arc for a second predetermined length of time;
a boost circuit for significantly increasing the power applied between said workpiece and said torch by applying a DC voltage in response to a loss of said arc.

* * * * *

UNITED STATES PATENT AND TRADEMARK OFFICE
CERTIFICATE OF CORRECTION

PATENT NO. : 4,963,715

DATED : October 16, 1990

INVENTOR(S) : Wayne H. Tuttle

It is certified that error appears in the above-identified patent and that said Letters Patent is hereby corrected as shown below:

COLUMN 9, LINE 41, CHANGE "1N1506" TO --1N5106--

COLUMN 11, LINE 33, CHANGE "IS SHOWN IS" TO --IS SHOWN IN--

COLUMN 12, LINE 60, CHANGE "RESUSE WELDING," TO --RESUME WELDING,--

Signed and Sealed this

Fourth Day of August, 1992

Attest:

DOUGLAS B. COMER

*Attesting Officer*    *Acting Commissioner of Patents and Trademarks*